(12) United States Patent
Yoshioka et al.

(10) Patent No.: US 8,708,137 B2
(45) Date of Patent: Apr. 29, 2014

(54) ARTICLE TRANSPORTING DEVICE

(75) Inventors: Hideo Yoshioka, Higashiomi (JP);
Shigeharu Tanii, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 273 days.

(21) Appl. No.: 13/130,175

(22) PCT Filed: Nov. 6, 2009

(86) PCT No.: PCT/JP2009/068978
§ 371 (c)(1),
(2), (4) Date: Jun. 24, 2011

(87) PCT Pub. No.: WO2010/064520
PCT Pub. Date: Jun. 10, 2010

(65) Prior Publication Data
US 2011/0247921 A1     Oct. 13, 2011

(30) Foreign Application Priority Data

Dec. 2, 2008 (JP) ................................. 2008-307898

(51) Int. Cl.
*B65G 25/06* (2006.01)

(52) U.S. Cl.
USPC ................ 198/750.1; 198/346.2; 198/468.01; 198/468.9

(58) Field of Classification Search
USPC .................... 198/750.1, 468.9, 468.01, 346.2
See application file for complete search history.

(56) References Cited

U.S. PATENT DOCUMENTS 5,931,288 A    8/1999  Avery
6,749,057 B2 *  6/2004  Kato ......................... 198/750.7
7,083,041 B1 *  8/2006  Foster et al. ............. 198/750.14
2003/0059284 A1  3/2003  Inui
2003/0059285 A1  3/2003  Inui

FOREIGN PATENT DOCUMENTS

JP          10231010 A    9/1998
JP         200372908 A    3/2003
JP         200372917 A    3/2003

* cited by examiner

*Primary Examiner* — Gene Crawford
*Assistant Examiner* — Matthew Marotta
(74) *Attorney, Agent, or Firm* — The Webb Law Firm

(57) ABSTRACT

The object is to provide an article transporting device in which dust generation can be prevented and in which it is hard for the operator at the operator's transfer location to be injured. The device comprises a reciprocating movable body configured to move in a forward and backward directions on a travel path extending between an operator's transfer location P and a non-operator's transfer location Q, a cover body 22 which partially covers an area above the reciprocating movable body which travels over an entire length of the travel path, an article support 20 connected to the reciprocating movable body by a connecting portion which extends upwardly from the reciprocating movable body and vertically through the slit 24 provided to the cover body, the article support being configured to move above the cover body along a direction of the travel path. The slit is formed such that the connecting portion remains out of contact with the cover body, when the reciprocating movable body moves along the travel path. A flexible and resilient cover 22s which can be elastically deformed is provided in an end forming portion 22E of the cover body which forms an end of the slit on a side of the operator's transfer location.

6 Claims, 6 Drawing Sheets

Fig.4
(a)
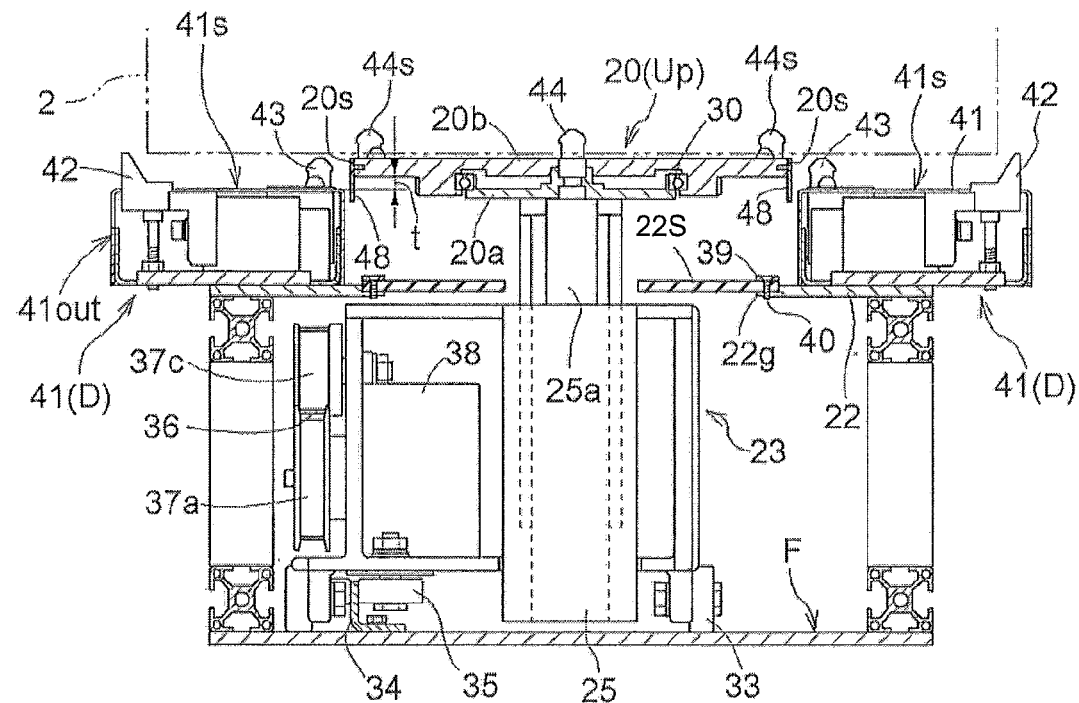
(b)
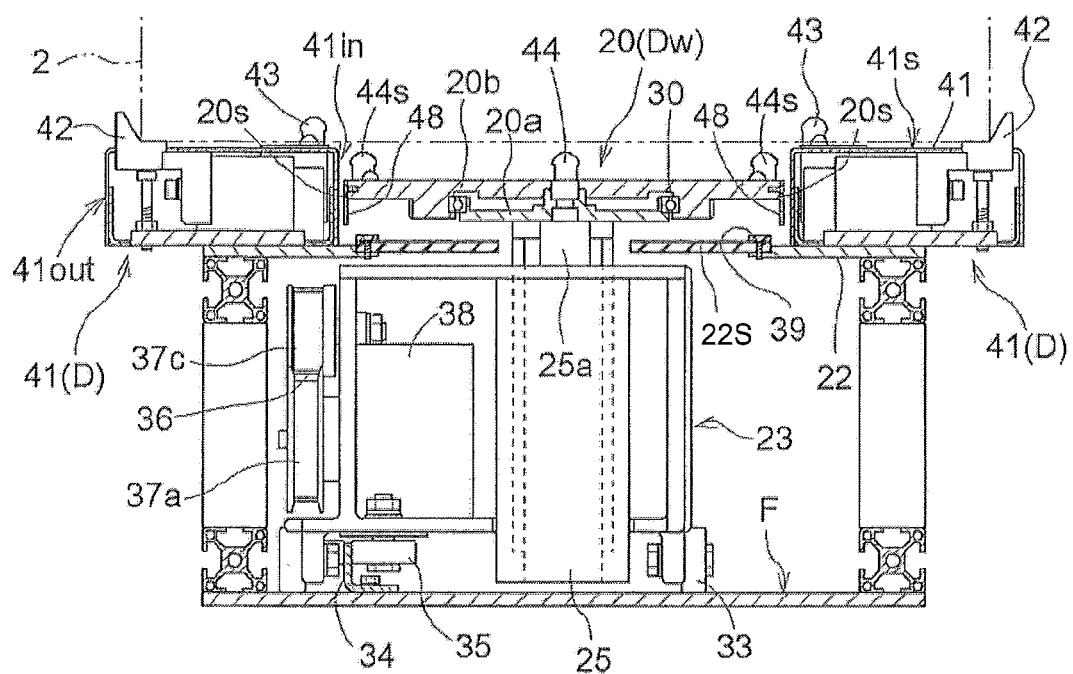

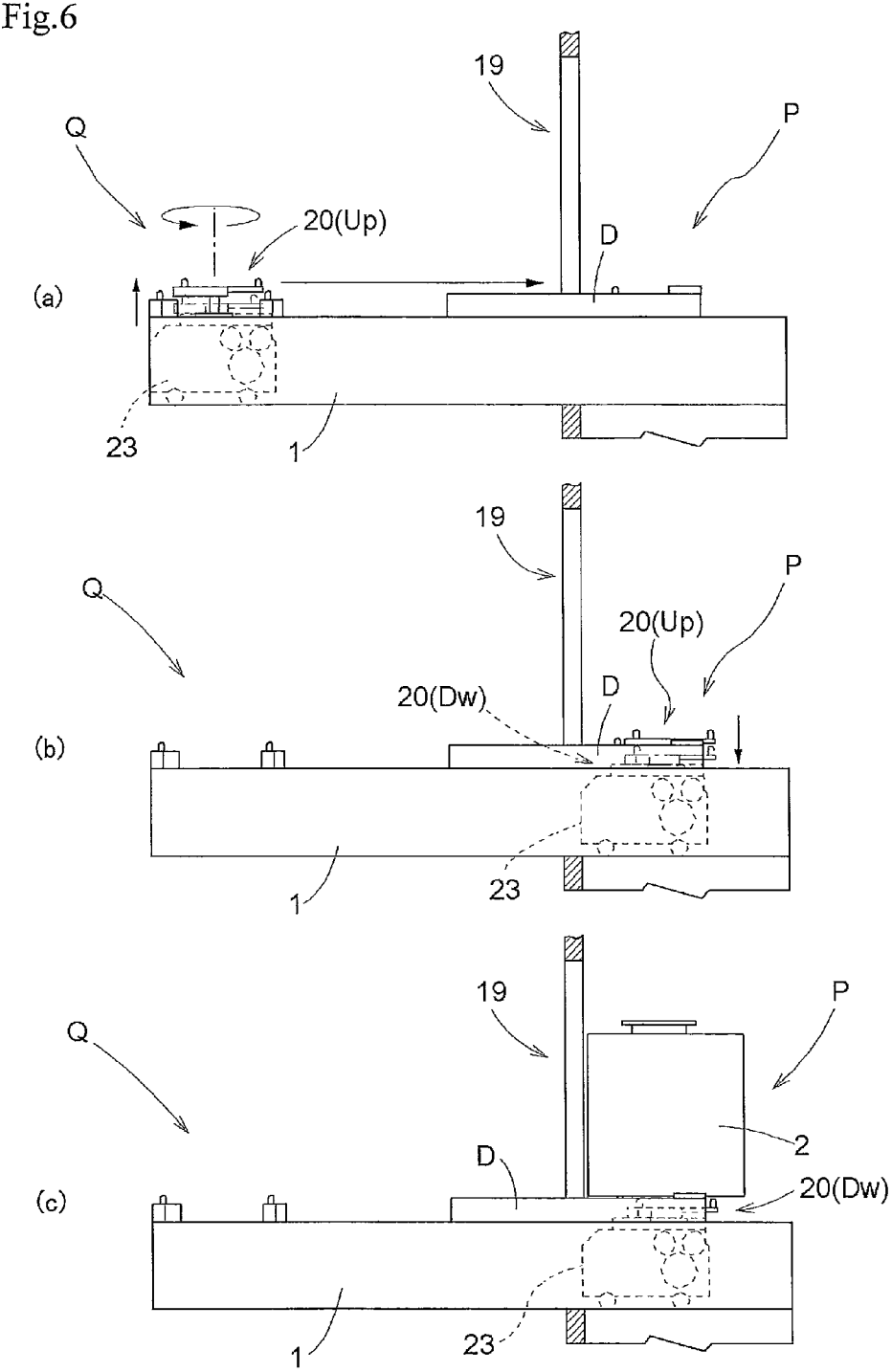

ARTICLE TRANSPORTING DEVICE

TECHNICAL FIELD

The present invention relates to an article transporting device comprising a reciprocating movable body configured to move in a forward and backward directions along a travel path having two ends and extending between a non-operator's transfer location and an operator's transfer location to and from which an article is transferred by an operator; a cover body which partially covers an area above the reciprocating movable body which travels over an entire length of the travel path, the cover body having a slit formed therein; and an article support for supporting an article and connected to the reciprocating movable body by a connecting portion which extends upwardly from the reciprocating movable body and vertically through the slit, the article support being configured to move above the cover body along a direction of the travel path as the reciprocating movable body moves in the forward and backward directions along the travel path.

BACKGROUND ART

An article transport device described above transports articles between (a) an operator's transfer location at which an operator performs transfer work, including supplying articles to be transported to an article transport device and receiving articles which have been transported by the article transport device, and (b) a non-operator's transfer location at which an automated device performs transfer work which includes supplying articles to be transported to an article transport device and receiving articles which have been transported by the article transport device.

In the article transport device described above, an area above the reciprocating movable body is covered with a cover to, among other things, prevent spreading of dust generated in the drive portion of the reciprocating movable body or of vapor of lubricating oil with which the drive portion is lubricated, and to prevent unwanted objects from entering into the travel path in which the reciprocating movable body travels in both directions. A slit is formed in this cover body along the travel path. And a connecting portion, which connects an article support and the reciprocating movable body, extends upwardly from the reciprocating movable body and vertically through the slit formed in the cover body. And the article support for supporting an article, connected to the reciprocating movable body by a connecting portion, is moved along the direction of the travel path by the movements of the reciprocating movable body in forward and backward directions along the travel path and below the cover body.

An example of a conventional article transport device of a type described above includes one in which the slit is formed such that the connecting portion remains in contact with the cover body when the reciprocating movable body moves along the travel path (see for example, Patent Document 1). In the article transport device of Patent Document 1, the portion which forms the slit in the cover body has edges that are elastically urged, over the total length of the slit, in the directions that tend to close the slit. The width of the slit is widened depending on the position of the connecting portion by virtue of the fact that the connecting portion, which moves with the movement of the reciprocating movable body, spreads apart the corresponding portion's of the two edges. With regard to the article transport device of Patent Document 1, it is stated that it is desirable for the ends of both edges to be formed with hard resin material with small coefficient of friction and with good anti-wear characteristics in order to reduce contact resistance between the connecting portion and the cover body when the connecting portion moves and spreads both edges apart as it moves.

PRIOR ART REFERENCES

Patent Documents

Patent Document 1: Japanese Patent Application Publication No. H10-231010

DISCLOSURE OF THE INVENTION

Problems to be Solved by the Invention

However, with the configuration of the example of the conventional device described above, it is not possible to prevent dust from being generated due to friction between the cover body and the connecting member since the connecting portion moves while remaining in contact with the cover body. Therefore, this is seen as something undesirable, for example, when installing the device in a clean room or the like in a semiconductor manufacturing factory where generation of even a small amount of dust poses a problem.

And since the article support is located in the cover body above a position on the side of the operator's transfer location when the reciprocating movable body is located at the end of the travel path on the side of the transfer location for a operator, it would not be safe for the operator located near the operator's transfer location to accidentally put a hand on a portion of the cover body near the operator's transfer location when the reciprocating movable body nears the end of the travel path on the side of the operator's transfer location. And if the width of the slit is formed widely enough to prevent dust generation, a gap will be formed over the entire length of the slit between the slit forming portion of the cover body and the connecting member. Thus, it would not be safe to place fingers, of the operator located in the operator's transfer location, near the slit end on the side of the operator's transfer location when the reciprocating movable body moves from the transfer location side for a non-operator to the operator's transfer location.

Incidentally, in order to make the transport device safer, it is possible to provide a detection means which consists of a plurality of sensors for detecting unwanted objects, such as operator's fingers, advancing into the space above the cover body so that the operation of the article transport device is stopped when the detection means detects entering foreign substance. However, to detect entering of operator's fingers, it is necessary to take into consideration a possibility that the fingers may enter not only from one specific direction but from one of various directions; thus, a detection means with a wide detection area is required, leading to disadvantages such as an increased size of the detection means, difficulty in installing, and higher cost for the greater functionality. And, since the operator putting her fingers into the space above the cover body is not an expected event, it is not easy to reliably detect such event.

The present invention was made in light of the reality described above, and its object is to provide an article transport device which can prevent dust from being generated and which is safer for the operator at the operator's transfer location.

Means for Solving the Problems

A article transporting device in accordance with the present invention comprises a reciprocating movable body configured to move in a forward and backward directions along a travel path having two ends and extending between a non-operator's transfer location and an operator's transfer location to and from which an article is transferred by an operator; a cover body which partially covers an area above the reciprocating movable body which travels over an entire length of the travel path, the cover body having a slit formed therein; and an article support for supporting an article and connected to the reciprocating movable body by a connecting portion which extends upwardly from the reciprocating movable body and vertically through the slit, the article support being configured to move above the cover body along a direction of the travel path as the reciprocating movable body moves in the forward and backward directions along the travel path wherein the slit is formed such that the connecting portion remains out of contact with the cover body when the reciprocating movable body moves along the travel path, and wherein a flexible and resilient cover which can be elastically deformed is provided in an end forming portion of the cover body which forms an end of the slit on a side of the operator's transfer location.

That is, because the slit is configured such that the connecting portion remains out of contact with the cover body when the reciprocating movable body moves along the travel path, a gaps are formed between the connecting portion and the cover body regardless of the position of the connecting portion in the travel path. And thus, the connecting portion does not contact the cover body when the reciprocating movable body moves along the travel path. Therefore, when the reciprocating movable body moves along the travel path, generation of dust by the connecting portion contacting and rubbing against the cover body can be prevented.

Also, although gaps are formed between the connecting portion and the cover body because the slit is configured such that the connecting portion remains out of contact with the cover body, because an elastically deformable and flexible resilient cover is provided in the end forming portion which defines an end of the slit in the cover body, on the side of the operator's transfer location, the resilient cover is located under the article support when the reciprocating movable body is located in the end of the travel path on the side of the operator's transfer location. Therefore, even if the operator at the operator's transfer location accidentally places fingers on the end forming portion in the cover body when the reciprocating movable body moves from the non-operator's transfer location side to the operator's transfer location, and if the fingers are in a position where they can be pinched between the cover body and the connecting portion or between the cover body and article support, the fingers will be pressed against by the connecting member or the article support, which causes the fingers to elastically deform the resilient cover. Therefore, the fingers will be located between the elastically deformed flexible and resilient cover and article support, providing greater safety to the operator.

Thus, the present invention can provide an article transport device in which generation of dust can be prevented and which is safer for the operator at the operator's transfer location.

In an embodiment of the invention, a portion of the end forming portion preferably consists of the resilient cover, and the resilient cover preferably consists of a plate-shaped resilient member in which a cut-out portion defining the end of the slit on the side of the operator's transfer location is formed, and wherein a portion of the end forming portion other than the resilient cover preferably includes an inelastic cover portion located in a periphery of the resilient cover, and the resilient cover and the inelastic cover portion are preferably connected at a circular-arc-shaped boundary.

That is, because a part of the end forming portion in the cover body consists of the resilient cover, and because the resilient cover consists of a plate-shaped resilient member in which a cut-out portion defining the end of the slit on the side of the operator's transfer location is formed, the resilient cover is easily elastically deformed because of its plate-shape which can be easily deformed when the fingers of the operator located in the operator's transfer location are pressed against by the connecting member or the article support. Therefore, when the operator's fingers are about to be pinched between the cover body and the connecting member or between the cover body and the article support, the resilient cover of the cover body, which consists of a plate-shaped resilient member, is pressed by the operator's fingers, and is deformed appropriately. Thereby, the operator's fingers are protected appropriately.

In addition, because a portion of the end forming portion other than the resilient cover includes an inelastic cover portion located in a periphery of the resilient cover, and because the resilient cover and the inelastic cover portion are connected at a circular-arc-shaped boundary, the resilient cover which consists of a plate-shaped resilient member is connected to the inelastic cover portion of the cover body by a part which spreads out radially from the end of the slit on the side of the operator's transfer location. Therefore the distance from the end of the slit on the side of the operator's transfer location to the inelastic cover portion is uniform. Therefore, when the plate-shaped resilient member is elastically deformed, the force that elastically deforms the resilient member is dispersed uniformly over the deforming area, which prevents, to the extent possible, deformation of any specific point of the plate-shaped resilient member, which in turn prevents, to the extend possible, the plate-shaped elastic member from being damaged due to breaking or tearing etc.

Thus, in the embodiment of the present invention, it is desirable to make the resilient cover easy to be deformed to protect the operator's fingers appropriately, and to prevent breakage of the resilient cover as much as possible.

In an embodiment of the invention, it is preferable that the article support is configured to be raised to a raised position and lowered to a lowered position by vertical movement means provided to the reciprocating movable body, and includes a plate-shaped support platform whose dimension in a lateral direction with respect to the travel path is less than a lateral dimension of an article to be transported and wherein article receiving platforms for receiving and supporting the article to be transported are provided at the operator's transfer location, wherein the article receiving platforms include a pair of load bearing portions having support surfaces which are located higher than an upper surface of the support platform in the lowered position and which are located lower than an undersurface of the support platform in the raised position with the load bearing portions extending inwardly toward a pair of side faces located on either side, in the travel path lateral direction, of the support platform located in the operator's transfer location, and wherein a pair of plate-shaped members is provided to the support platform for blocking gaps formed between the undersurface of the support platform and the support surfaces of the pair of load bearing portions when the support platform is in the raised position.

That is, because the article support can be raised to a raised position and lowered to a lowered position by a vertical movement means provided to the reciprocating movable body and includes a plate-shaped support platform whose dimension in a lateral direction with respect to the travel path is less than a lateral dimension of an article to be transported, the article to be transported is moved vertically by the vertical movement means with the central portion, in the lateral direction of the travel path, of the article to be transported being received and supported by the support platform. And because the article receiving platforms include a pair of load bearing portions having support surfaces which are located higher than an upper surface of the support platform in the lowered position and which are located lower than an undersurface of the support platform in the raised position with the load bearing portions extending inwardly toward a pair of side faces located on either side, in the travel path lateral direction, of the support platform located in the operator's transfer location, the article to be transported is received and supported by the pair of load bearing portions with the portions of the article closer to the lateral sides in the lateral direction with respect to the travel path being supported on the support surfaces of the pair of load bearing portions.

Therefore, by moving the reciprocating movable body to the operator's transfer location with the support platform supporting the article located in the raised position, the bottom of the article moves into a position above the support surfaces of the pair of load bearing portions. In this state, as the vertical movement means is operated to lower the support platform from the raised position to the lowered position, the lateral end portions of the bottom face of the article in the lateral direction with respect to the travel path come to be supported by the pair of load bearing portions and the support platform moves into the lowered position away from the bottom of the article.

And, if the reciprocating movable body is moved to the operator's transfer location while keeping the support platform in the lowered position, when the article is received and supported by the article receiving platforms, that is when the lateral end portions of the bottom of the article in the lateral direction with respect to the travel path of the reciprocating movable body being received and supported by the pair of load bearing portions, the support platform can be moved into a position beneath the central portion of the bottom of the article with respect to the lateral direction of the travel path of the reciprocating movable body. In this state, by operating the vertical movement means to raise the support platform from the lowered position to the raised position, the upper surface of the support platform moves to a position higher than the support surfaces of the pair of load bearing portions. Thus, the article moves away from the pair of load bearing portions after the support platform contacts the bottom of the article so that the bottom of the article is received and supported by the support platform above the article receiving platforms.

Thus, by supporting the article on the article receiving platform installed in the operator's transfer location, the article can be scooped up by the support platform and can be transported to the non-operator's transfer location. And, by leaving the article receiving platform empty with no articles supported thereon, the article received and supported by the support platform can be transported from the non-operator's transfer location to the operator's transfer location to supply an article to the article receiving platform so that the support platform and the reciprocating movable body can be located in the suitable position for a subsequent transporting operation.

In addition, because a pair of plate-shaped members is provided to the support platform for blocking the gaps formed between the undersurface of the support platform and the support surfaces of the pair of load bearing portions when the support platform is in the raised position, the gaps formed along the direction of the travel path and between the undersurface of the support platform and the support surfaces of the load bearing portions when the support platform is in the raised position can be kept closed. And because these plate-shaped members are provided to the support platform, when the support platform is lowered from the raised position to the lowered position, the support platform and the plate-shaped members are lowered in unison without opening the gaps formed along the direction of the travel path and between the undersurface of the support platform and the support surfaces of the load bearing portions.

Therefore, when lowering the support platform with the reciprocating movable body located in the operator's transfer location such as, when supplying the article received and supported by the article supporting platform to the article receiving platform, or when the reciprocating movable body has been moved, in advance, to the end of the travel path on the side of the operator's transfer location and is standing by for an article to be transferred to the article receiving platforms by an operator, the undersurface of the support platform is moved from a position higher than the upper surface of each load bearing portion of the article receiving platforms to a lower position. However, the operator safety is improved because the gaps, formed along the direction of the travel path and between the undersurface of the support platform and the support surfaces of the load bearing portions, remain closed while lowering the support platform from the raised position to the lowered position, as described above.

As such, in an embodiment of the invention, the device is convenient to use since the transfer of the article can be performed by making use the load bearing portion, and provides an article transport device with high degree of safety.

In an embodiment of the invention, the operator's transfer location is preferably located outside an article storage for storing a plurality of articles, and the non-operator's transfer location is preferably located inside the article storage.

That is, because the operator's transfer location is located outside an article storage for storing a plurality of articles, and the non-operator's transfer location is located inside the article storage, articles can be transported between a location inside the article storage and an outside location. Therefore, the operator can stay at the operator's transfer location located outside the article storage to handle the article, and the articles can be easily taken into or out of the article storage.

As such, the article transport device is provided which can simplify the work to take articles into and out of the article storage. In an embodiment of the invention, the inelastic cover portion preferably includes an upwardly facing face which contacts a part of a bottom face of the resilient cover, and a vertically extending face which contacts at least a part of a side face of the resilient cover that extends vertically and each of the plate-shaped members is preferably configured to extend downwardly beyond a corresponding one of the support surfaces of the load bearing portions when the support platform is in the raised position.

BRIEF DESCRIPTION OF THE DRAWINGS

FIG. 4 is a vertical sectional front view of the conveyor, FIG. 6 is a figure for depicting the operation of the conveyor.

BEST MODES FOR CARRYING OUT THE INVENTION

Figure 1:
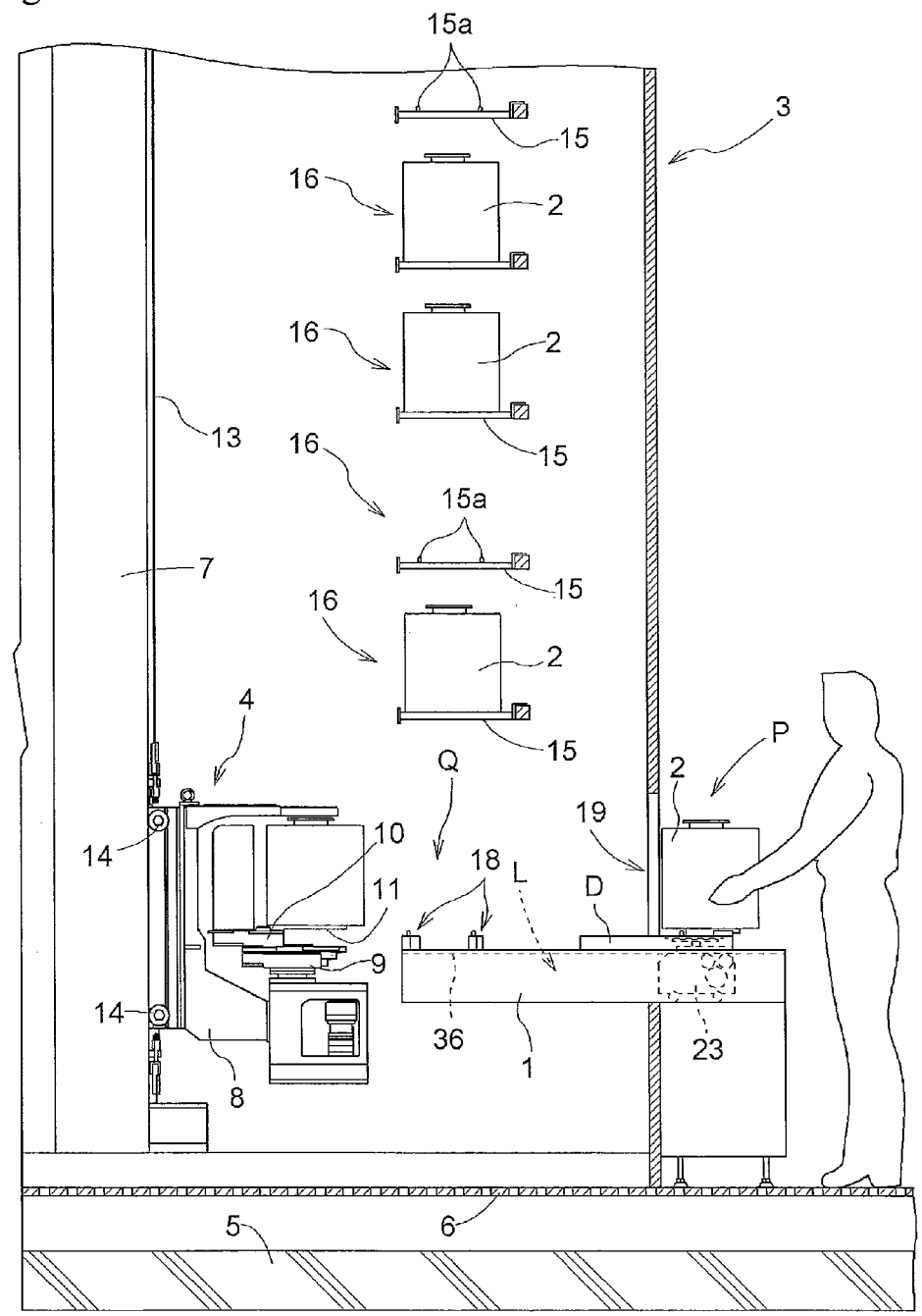
FIG. 1 is an overall side view of the stocker and the conveyor.
Figure 2:
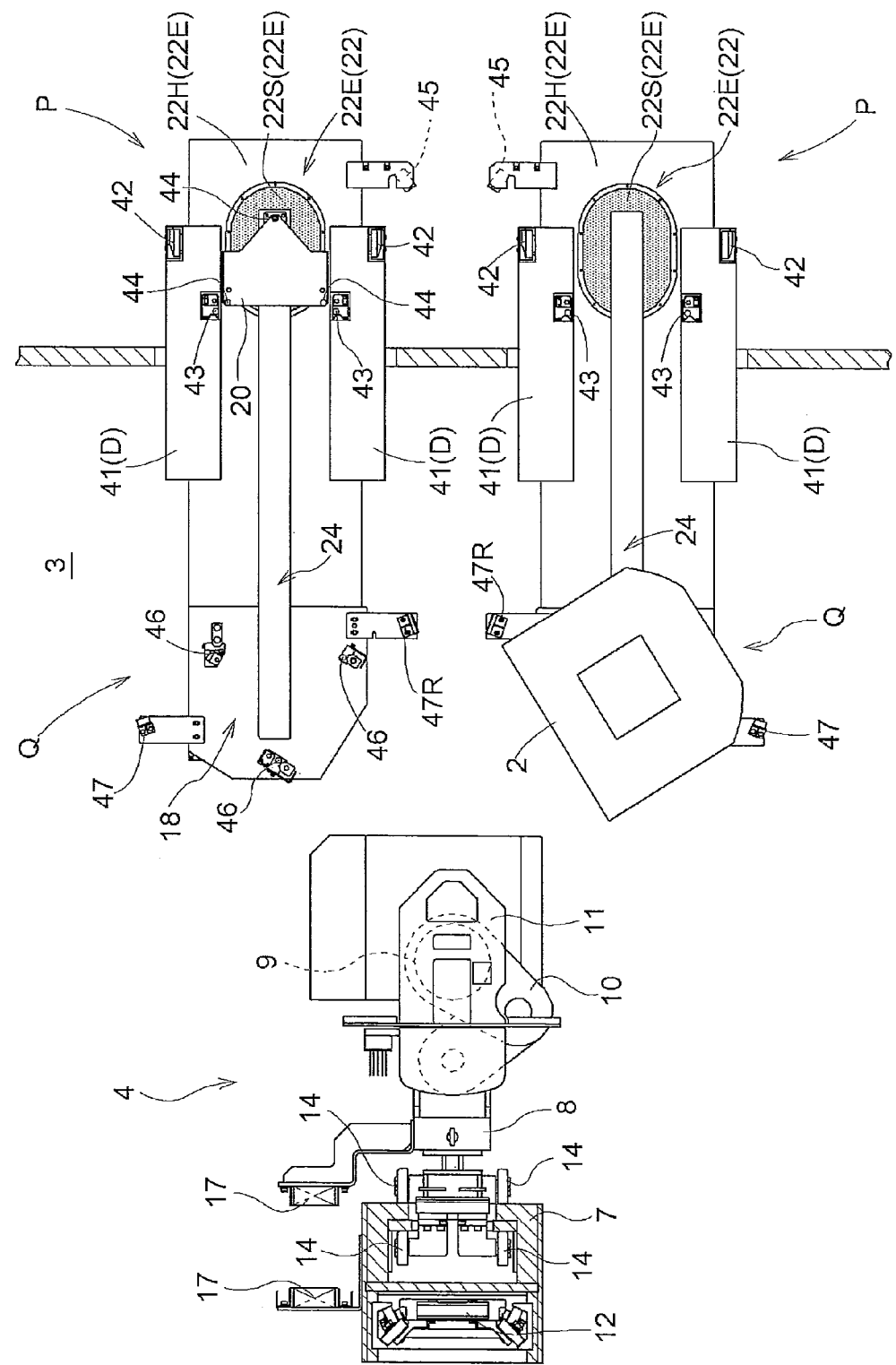
FIG. 2 is an overall schematic plan view of the in-storage transfer device, and the conveyor.

The preferred embodiments of the article transporting device in accordance with the present invention are described next with reference to the attached drawings. As shown in FIGS. 1 and 2, the conveyor 1 (an article transporting device) is provided to carry containers 2 into the stocker 3 (an article storage) and to take the containers 2 out of the stocker 3. A container 2 (an example of an article in the present application) is made of resin and stores a plurality of semiconductor substrates. In the present specification, the term "stocker" refers to a storage facility such as a warehouse, etc. for storing articles.

One end of the conveyor 1 which is located outside the stocker 3 is the operator's transfer location P at which unloading transfer in which a container 2 to be taken out of the stocker 3 is unloaded (that is, handed out) outside the stocker 3, and loading transfer in which a container 2 to be taken into the stocker 3 is scooped up (that is, received) outside the stocker 3 are performed. And the end of the conveyor 1 which is inside the stocker 3 is the transfer location Q for a non-operator at which loading transfer in which a container 2 to be taken out of the stocker 3 is scooped up inside the stocker 3, and unloading transfer in which a container 2 to be taken into the stocker 3 is unloaded inside the stocker 3 are performed. And while standing near the operator's transfer location P, an operator performs a transfer work in which the operator receives a container 2 located at the operator's transfer location P of the conveyor for supplies a container 2 to the operator's transfer location P of the conveyor 1.

The stocker 3 and the conveyor 1 are installed in a clean room equipped with an air cleaning means. Near the floor of the clean room, a perforated grating floor 6 is provided above and spaced from the slab floor 5. Near the ceiling of the clean room, an air filter (not shown) which consists of a HEPA filter, among other things, is provided below and spaced apart from the ceiling. The air cleaning means includes an air intake chamber formed below the grating floor 6, a chamber formed above the air filter, and a circulating conduit which communicates the air intake chamber with the chamber. And the circulating conduit has an ventilation fan and a pre-filter. And a downward flow of clean air is formed from the ceiling toward the floor by operating the ventilation fan of the air cleaning means.

An in-storage transfer device 4 of a vertically movable type is installed inside the stocker 3. The term "in-storage", as used in this specification, means inside the stocker, and the term "out-storage" means outside the stocker. The in-storage transfer device 4 comprises a vertically movable body 8 which can be raised and lowered along an in-storage vertical movement guide 7 arranged vertically on the grating floor 6, and a support platform 11, for in-storage transfer, attached to the vertically movable body 8 through a swing base 9 and a linkage mechanism 10. The swing base 9 is configured to rotate about a vertical shaft supported by the vertically movable body 8. The linkage mechanism 10 includes a first arm whose the end portion is pivotably attached to the swing base 9, and a second arm pivotably attached to the other end portion of the first arm. The support platform 11 for in-storage transfer is pivotably attached to the other end portion of the second arm.

The vertically movable body 8 is connected at its upper portion and lower portion to and suspended by a vertical movement belt 13 which consists of a timing belt wound around an upper pulley and a lower pulley (not shown), and which is connected to a lower end and an upper end of the balance weight 12. Any known material such as rope, wire, etc. may be used instead of the timing belt. In addition, provided at upper end and lower end portions of the vertically movable body 8 is a plurality of guide rollers 14 that have lateral axes and that are in contact with a flat guide surface formed in the in-storage vertical movement guide 7 along the vertical direction. And the vertically movable body 8 can be raised or lowered along the in-storage vertical movement guide 7 by winding the belt 13 for the vertical movement in a forward or a reverse direction. In addition, shown at the reference numeral 17 in FIG. 2 is a cableveyor (that is, a wire guide) for supporting electric wires, such as an operating electric power cable, control lines, etc. for the vertically movable body 8.

A plurality of storage platforms 15 which receive and support the containers 2 is provided within the stocker 3, and a storage unit 16 for storing a container 2 is defined by the space above each storage platform 15. The storage units 16 are arranged to form multiple layers in the vertical direction and are radially arranged so as to surround the in-storage transfer device 4 in plan view. In addition, formed on the upper surface of each storage platform 15 are projecting positioning pins 15a that engage grooves formed in the bottom of the container 2 to be supported, to fix the position of the container 2 on the storage platform 15.

The support platform 11 for in-storage transfer is moved and its attitude in plan view is changed by a combination of a vertical movement of the vertically movable body 8, a rotating movement of the swing base 9, and an expanding and retracting movement of the linkage mechanism 10, in order to perform a container take-out handling operation in which a container 2, that is received and supported by the storage platform 15 thus stored in the storage unit 16, is scooped up and is received and supported on the in-storage conveyor support platform 18 provided in the non-operator's transfer location Q of the conveyor 1, and to perform a container take-in handling operation in which the container 2, that is received and supported by the in-storage conveyor support platform 18, is scooped up and is received and supported on an empty storage platform 15 in the storage unit 16.

The conveyor 1 is set at the same height above the grating floor 6 as the height of the operator's waist. The container 2 for transporting is supported and transported between the operator's transfer location P and the non-operator's transfer location Q by the support platform 20—described below in more detail—that moves back and forth along a horizontal transporting surface located approximately at the height of the waist of the operator who takes in an out the container 2 at the transfer location for an operator P. And as shown in FIG. 4, by raising the support platform 20 to a lifted position Up for transporting where its upper surface is at the transporting surface, and by lowering the platform 20 to a lowered position Dw for transferring located below the lifted position Up for transporting at the operator's transfer location P and the non-operator's transfer location Q, a container 2 can be transferred between the support platform 20 and the in-storage conveyor support platform 18 at the operator's transfer location P or the container 2 can be transferred between the support platform 20 and article receiving platforms D at the non-operator's transfer location Q.

A pair of the conveyor 1 is provided with each corresponding to each of the pair of access openings 19 next to each other on a wall surface of the stocker 3. Although there is a difference between the two, such as a difference in the supporting structures at the non-operator's transfer location Q, the main parts are of the same configuration; thus, only one of the conveyors 1 is described below.

Figure 3:
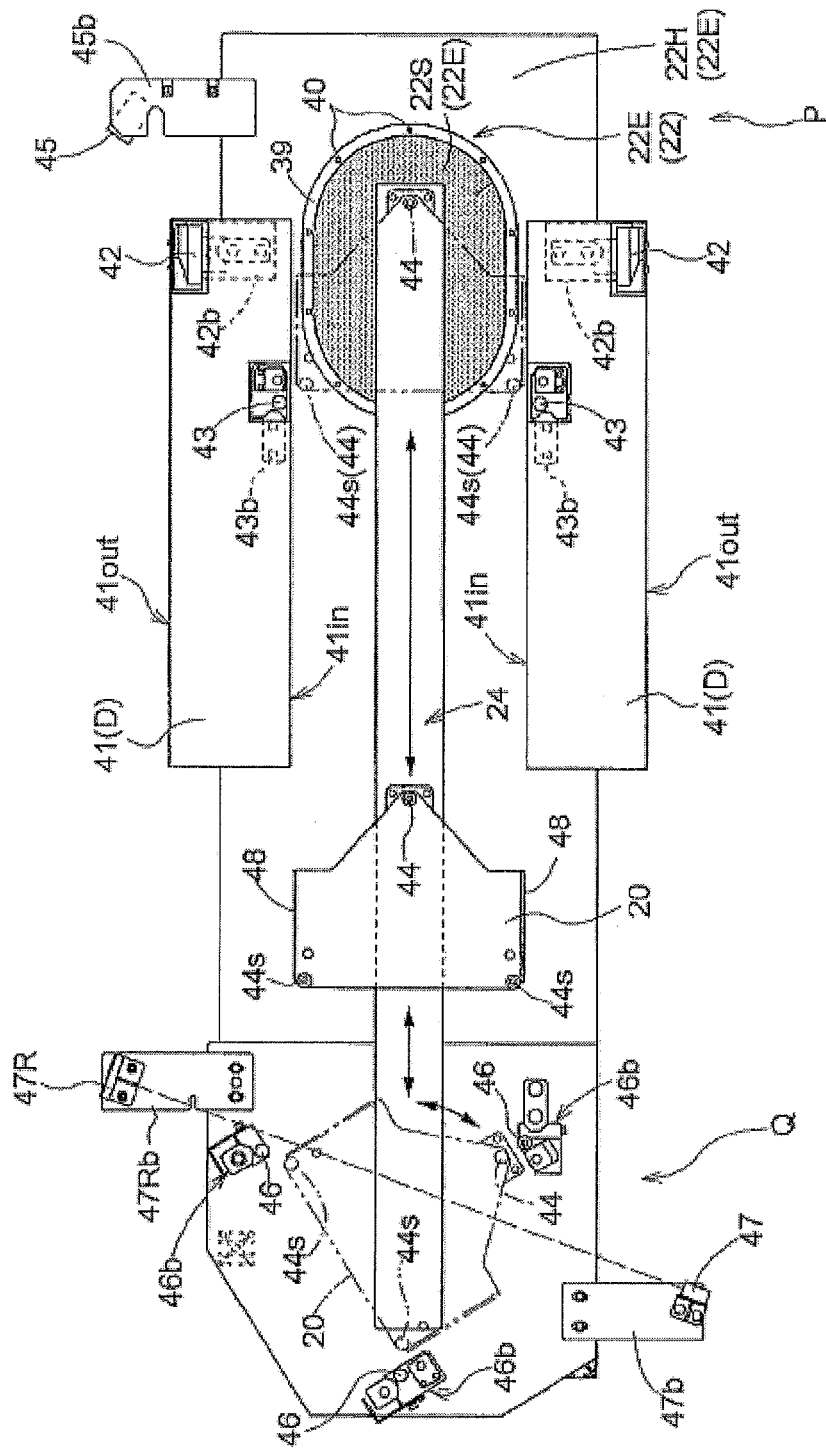
FIG. 3 is an overall plan view of the conveyor.
Figure 5:
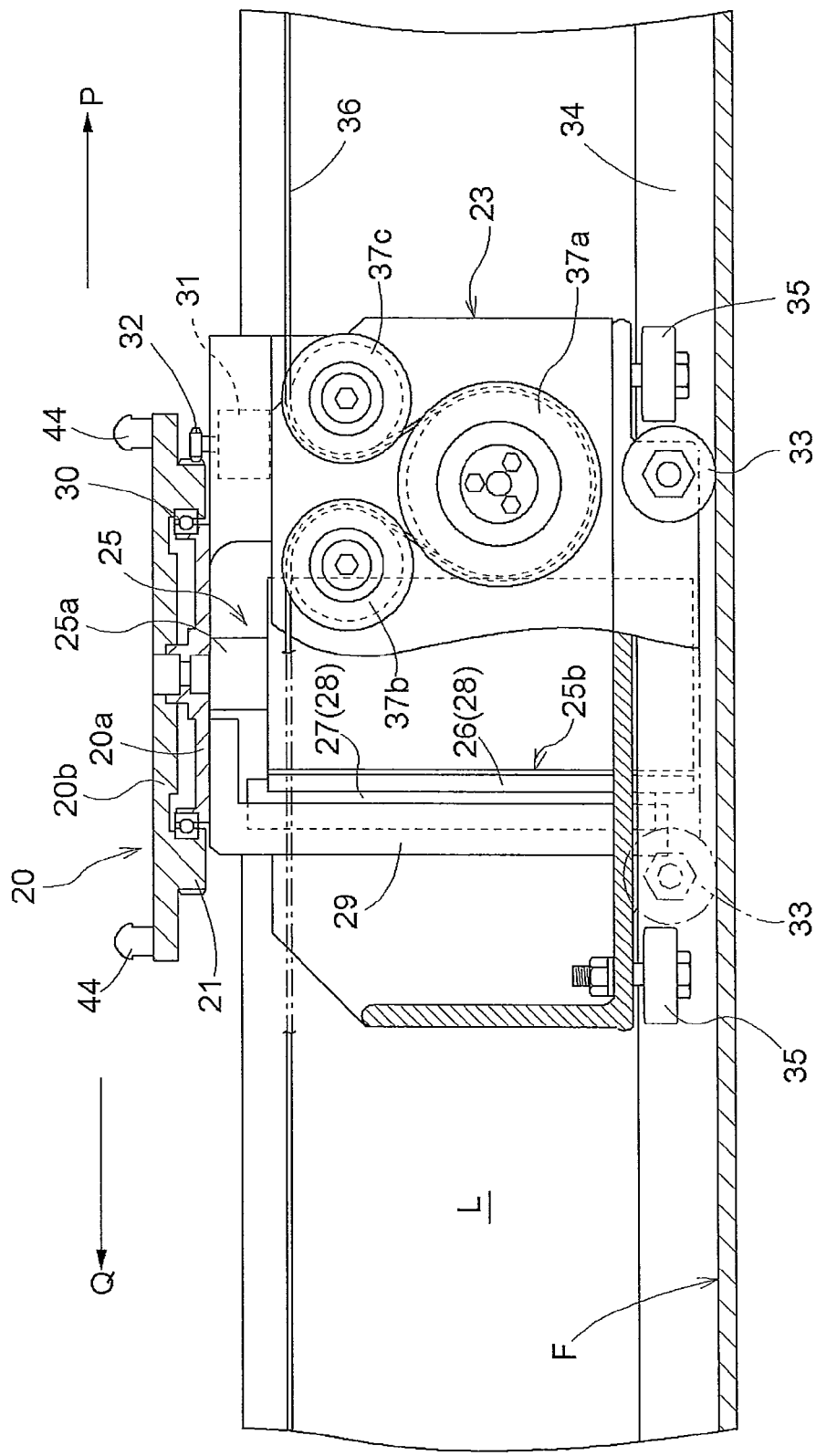
FIG. 5 is a vertical sectional partial side view of the conveyor.

As shown in FIGS. 3-5, most of the upper surface of the conveyor 1 is covered by a top plate 22 made of aluminum. A self-propelling vehicle 23 is provided as a reciprocating movable body which can move in one direction and the opposite direction along the travel path L extending between the first end and the second end in the conveyor interior space formed below the top plate 22. That is, the top plate 22 covers an area above the self-propelling vehicle 23 which travels over the entire length of the travel path L. FIG. 4 is a sectional and elevational view as seen by one who faces toward the non-operator's transfer location Q from the operator's transfer location P side. FIG. 4 (*a*) shows a case where the support platform 20, which can be raised and lowered above the top plate 22, is located in the raised position Up, and FIG. 4 (*b*) shows the case where the support platform 20 is located in the lowered position Dw.

The self-propelling vehicle 23 includes a vertical movement motor 25 as a vertical movement means for performing a vertical movement operation of the support platform 20. The vertical movement motor 25 is installed such that the rotating shaft of the motor shaft is oriented vertically. The motor 25 has a ball screw shaft, whose axis coincides with the motor shaft, and which is connected with the motor shaft to be rotatable therewith. The portion close to the distal end of this ball screw shaft has a nut that meshes through balls, and a moving bracket 25*a* which is fixedly attached to this nut.

As shown in FIG. 5, mounted to one side of the motor cover 25*b* of the vertical movement motor 25 is a rolling linear guide bearing 28 consisting of a guide rail 26 and a guide block 27. The mounting positions of the guide rail 26 and the guide block 27 of the rolling linear guide bearing 28 are adjusted such that the guiding direction is parallel to the direction of the movement of the moving bracket 25*a*. The moving bracket 25*a* provided to the vertical movement motor 25 is connected to a central part of the bottom of the support platform 20. The guide block 27 of the rolling linear guide bearing 28 is connected to the bottom of the support platform 20 through a connecting member 29. With the structure described above, the support platform 20 can be moved vertically as the moving bracket 26 is moved vertically in the direction of the pivot shaft of the motor shaft and the ball screw shaft, by rotating the vertical movement motor 25.

The vertically movable platform 20 consists of a disk-shaped base plate 20*a* to which the moving bracket 25*a* and the connecting member 29 are connected, and a support platform main body 20*b* provided to this base plate 20*a* for rotation with respect to the base plate 20*a* through the cross rolling bearing 30. An annular projection 21, whose center coincides with the center of the base plate 20*a*, is formed in the bottom of the support platform main body 20*b*, and gear teeth are formed in the peripheral surface of this annular projection 21. A pinion gear 32 that can be raised and lowered through a spline connection is attached to a motor shaft of a turning motor 31 provided to the chassis of the self-propelling vehicle 23 that can be rotated in unison with the motor shaft such that the pinion gear 32 can be rotated integrally with the motor shaft. And this pinion gear 32 and the peripheral surface of the annular projection 21 as its spur gear are configured to mesh with each other. With this configuration, the support platform main body 20*b* is rotated in a horizontal plane between a standard attitude and a rotated attitude about the center of the base plate 20*a* as its pivot axis, as the turning motor 31 is rotated in one or the other direction. Incidentally, the rotation of the support platform main body 20*b* is performed at the non-operator's transfer location Q.

Four freely rotating wheels 33, that contact the travel surface F which forms the bottom of a conveyor interior space, are provided at each of a front and rear and right and left locations with respect to the travel direction in the bottom of the chassis of the self-propelling vehicle 23. A travel guide rail 34 is installed in the travel surface F of the conveyor interior space and along the travel path L. Two pairs of travel guide rollers 35, (having vertical axes) provided at a forward location and a backward location with respect to the traveling direction and at the bottom of the chassis of the self-propelling vehicle 23, contact the travel guide rail 34 such that the guide rollers 35 hold the travel guide rail 34 from right and left (see FIG. 4). Provided in the conveyor interior space is a toothed belt 36 for travel whose ends are connected to the wall near the operator's transfer location P and to the wall near the non-operator's transfer location Q at a height above the travel surface F and below the top plate 22. The self-propelling vehicle 23 is configured to be able to travel in both directions along the travel path L while guided by the travel guide roller 35 and the travel guide rail 34, by drawing in and feeding out the toothed belt 36 by a toothed driving pulley 37*a* which is rotated by the travel motor 38 of the self-propelling vehicle 23, as well as a guide pulley 37*b*, and a tension pulley 37*c*.

The support platform 20 is connected to the self-propelling vehicle 23 by the moving bracket 25*a* and the connecting member 29 which function as a connecting portion, as described above, and is able to travel along the travel path and above the cover body as the self-propelling vehicle 23 moves back and forth along the travel path L. The support platform 20 defines the article support of the present application.

The height of the above-mentioned top plate 22 is between the self-propelling vehicle 23 and the support platform 20. Therefore, the moving bracket 25*a* and the connecting member 29, which function as a connecting member that connect the support platform 20 to the self-propelling vehicle 23 such that the support platform 20 can be raised and lowered, extend above from the self-propelling vehicle 23 and vertically through the slit 24 formed in the top plate 22 along the travel path L. And, since the opening width of the slit 24 is defined to be greater than the dimensions of the moving bracket 25*a* and the connecting member 29 in the lateral direction with respect to the travel path of the self-propelling vehicle 23, non-contact state is maintained with the top plate 22 as the self-propelling vehicle 23 moves along the travel path. Therefore, since the moving bracket 25*a* and the connecting member 29 do not come into contact with the top plate 22 even when the self-propelling vehicle 23 travels, generation of dust can be prevented.

As shown in FIG. 3, a part of an end portion 22E of the slit 24, which forms an end on the side of the operator's transfer location P, is formed by an elastically deformable, flexible and resilient cover 22S in an area of the horizontally extending top plate 22 and near the operator's transfer location P. The resilient cover 22S is a plate-shaped resilient member which has a rectangular cut-out portion extending in the longitudinal direction and which is made of silicon rubber having a horseshoe shape or an ellipse-shape in plan view. The rectangular cut-out portion extending along the longitudinal direction of this plate-shaped resilient member defines the end of the slit 24 on the side of the operator's transfer location P. The resilient cover 22S is formed by cutting out a portion of the top plate 22 on the side of the operator's transfer location P, in a horseshoe shape or an ellipse shape in plan view and by forming a flange around its peripheral portion 22*g* (see FIG. 4). And the resilient cover 22S is attached to an inelastic cover portion 22H, which constitutes a portion of the top plate 22 other than the resilient cover 22S, by fastening down the peripheral portion by bolts or screws at a plurality of locations along the peripheral portion 22g. In the present embodiment, the shape of this cut-out portion has a first circular arc portion at one end and a second circular arc portion at the opposite end with these circular portions connected by straight portions. As shown in FIG. 4, the flange is formed by cutting or machining a portion of the peripheral portion of the cut-out portion 22g of the inelastic cover portion 22H to reduce the thickness of the inelastic cover portion 22H in an area having a predetermined horizontal width. Thus, the portion of the inelastic cover portion 22H in the area of the peripheral portion 22g overlaps in plan view with a part of the resilient cover 22S, and has an upwardly facing surface that contacts a bottom surface of the portion of the resilient cover 22S and a vertical surface that contacts a side face of the resilient cover 22S that extends in the vertical direction. The plate-shaped elastic body that functions as a resilient cover 22S is bolted down with flat head screws 40 against the peripheral portion 22g by a metal press-down frame 39, which is placed on the upper surface of the resilient member, and which is shaped identically with the peripheral portion 22g in plan view, and which has screw holes for attachment at places corresponding to the above-mentioned locations. The screws are spread apart such that the adjacent screws are as equally spaced apart as possible.

Thus, a part of end forming portion 22E consists of the resilient cover 22S. And this resilient cover 22S consists of a plate-shaped resilient member in which the cut-out portion is formed, and which defines the end of the slit 24 on the side of the operator's transfer location P. The portion of the end forming portion 22E other than the resilient cover 22S consists of an inelastic cover portion 22H located in the periphery of the resilient cover. And the resilient cover 22S and the inelastic cover portion 22H are connected at a circular-arc-shaped boundary.

Therefore, the resilient cover 22S is located under the support platform 20 when the support platform 20 is located at the operator's transfer location P. And the resilient cover 22S and the inelastic cover portion 22H are connected at a circular-arc-shaped boundary at least in a portion of the connecting area between the resilient cover 22S and the inelastic cover portion 22H on the side of the operator's transfer location P.

And, as shown in FIG. 4, the width of the support platform main body 20b in the lateral direction (i.e., the direction which intersects perpendicularly with the direction in which the travel path L extends) of the travel path L is less than the width in the lateral direction of the container 2. Thus, the support platform 20 is plate-shaped whose dimension in the lateral direction of the travel path L is less than the dimension of the container 2 in the lateral direction of the travel path L.

The article receiving platforms D provided in the operator's transfer location P are described next. The article receiving platforms D consist of a pair of horizontal load bearing portions 41 with each load bearing portion 41 having a rectangular parallelepiped shape whose longitudinal direction extends along the travel path L. The load bearing portions 41 are fixed on the top plate 22 such that they extend parallel to each other. The upper surfaces 41s of the article receiving platforms D are located higher than the upper surface of the support platform 20 in the lowered position Dw for transferring and lower than the undersurface of the support platform 20 in the lifted position Up for transporting. The spacing between the inward surfaces 41 in of the load bearing portions 41 is slightly greater than the dimension—in the lateral direction of the travel path L—of the support platform 20 which moves in both directions above the top-plate 22 so that the support platform 20 can move between the load bearing portions 41 without contacting the load bearing portions 41.

Thus, the article receiving platforms D include a pair of load bearing portions 41 with the support surfaces 41s which are located higher than the upper surface of the support platform 20 in the lowered position Dw for transferring and lower than the undersurface of the support platform 20 in the lifted position Up for transporting such that the load bearing portion 41 extends inwardly toward respective one of the pair of side faces—located on both sides with respect to the travel path lateral direction—of the support platform 20 in the operator's transfer location P.

A side receiving member 42 is attached to the support surface 41s of the load bearing portion 41 through a side receiving member attachment bracket 42b with a position adjusting function and near the outward surface 41 out and in an end area closer to the operator's transfer location P. And a load-bearing-portion-side positioning pin 43 is attached to the support surface 41s at a location near the inward surface 41 and closer to the non-operator's transfer location Q than the side receiving member 42 through a pin attachment bracket 43b with a position adjusting function. Each of the pair of the side receiving members 42 has a guide slope which extends upwardly and laterally outwardly, as shown in FIG. 4. Because of this structure, when the article receiving platforms D receive and support a container 2, a pair of the side receiving members 42 supports the edge of the bottom of the container 2. The container 2 is positioned in a proper position for transfer at the operator's transfer location P by virtue of the fact that a pair of load-bearing-portion-side positioning pins 43 engage two long engaging holes or slots located closer to both lateral sides among the three long concave holes or slots formed in radial directions in the central part of the bottom of the container 2. Shown at the reference numeral 45 in FIG. 3 is an out-storage article sensor which detects any container 2 that exists in the transfer position in the operator's transfer location P. The out-storage article sensor 45 is mounted to an out-storage sensor attachment bracket 45b with a position adjusting function with the sensor 45 adjusted such that the detection light points obliquely upward.

Three support-platform-side positioning pins 44 project from the upper surface in the support platform main body 20b of the support platform 20, as shown by FIG. 3. These positioning pins 44 are arranged so that each engages the corresponding one of three long concave engaging holes or slots formed in radial directions in the bottom of a container 2. And when the support platform 20 which moves in both directions is at the position closest to the operator's transfer location (i.e. position of the support platform 20 shown with dashed lines in FIG. 3), the direction—along which each of the lateral pins 44s located on right-and-left both sides with respect to the direction of the reciprocal movements of the support platform 20 among the three positioning pins 44 and the corresponding one of the load-bearing-portion-side positioning pins 43 described above are lined up in plan view—coincides with the longitudinal direction of the corresponding long concave engaging holes or slots on both-side portions of the container 2 that is located in the position for transfer at the operator's transfer location P.

With this structure, by lowering the support platform 20 at the operator's transfer location P, the positioning pins including both of the lateral pins 44s and the load-bearing-portion-side positioning pins 43 engage—at inward locations closer to the center of the bottom surface and at outward locations closer to the periphery of the bottom surface—with the long concave engaging holes located closer to the lateral sides. Thereafter, the container 20 received and supported by the support platform 20 located in the lifted position Up for transporting is received and supported by the article receiving platforms D with the container 20 positioned in the transfer position in the operator's transfer location P. And conversely, by raising the support platform 20 in the lowered position Dw for transfer at the operator's transfer location P, the positioning pins including both of the lateral pins 44s and the load-bearing-portion-side positioning pins 43 engage—at inward locations closer to the center of the bottom surface and at outward locations closer to the periphery of the bottom surface—with the long concave engaging holes located closer to the lateral sides. Thereafter, the container 20 received and supported by the article receiving platforms D with the container 20 positioned in the transfer position in the operator's transfer location P is received and supported by the support platform 20 with the container 20 positioned by the three support-platform-side positioning pins 44.

In addition, three in-storage positioning pins 46 are attached in the end of the conveyor 1 which is closer to the non-operator's transfer position Q, with the positions of the positioning pins 46 adjusted by pin attachment brackets 46b with a position adjusting function. These three in-storage positioning pins 46 individually engage the three long concave engaging holes in the bottom of the container 2 to position the container 2 in the transfer position at the non-operator's transfer location Q. Similar to the case at the operator's transfer location P, a container can be transferred from the support platform 20 to the transfer position in the non-operator's transfer location Q and from the transfer position in the non-operator's transfer location Q to the support platform 20. Shown at the reference numeral 47 in FIG. 3 is an in-storage article sensor for detecting any container 2 that exists in the transfer position in the non-operator's transfer location Q. The in-storage article sensor 47 is mounted to an in-storage sensor attachment bracket 47b with a position adjusting function with the sensor 47 adjusted such that the detection light is emitted toward a reflecting plate 47R mounted to a reflecting plate mounting attachment bracket 47Rb with a position adjusting function.

Mounted to the pair of side faces 20s located on both sides of the support platform 20 in the lateral direction with respect to the travel path L is a pair of plate-shaped members 48, each of which extends downwardly from the undersurface of the support platform 20 by a distance which is greater than the distance between the undersurface of the support platform 20 in the lifted position Up for transporting at the operator's transfer location P and the corresponding one of the support surfaces 41s of the pair of load bearing portions 41. And each of the plate-shaped members 48 has a length equal to the length in the direction of the travel path L of the pair of side faces 20s of the support platform 20. The plate-shaped members 48 are mounted to the overlap portions having the thickness of the support platform 20 by screws at a plurality of locations along the longitudinal direction of the side faces 20s. Since the fingers of the operator are prevented from entering the gaps formed between the load bearing portions 41 and the support platform 20 because these plate-shaped members 48 are attached, operator safety is improved for when the support platform 20 is lowered from the lifted position Up for transporting shown in FIG. 4 (*a*) to the lowered position Dw for transferring shown in FIG. 4 (*b*).

Operation of the conveyor 1 having the above-described configuration is described next with reference to FIG. 6. The following operations of the conveyor 1 are performed by a control device operating each actuator based on the detected information from various sensors and encoders. This control device has a CPU, memory, and a communication unit for communicating with the sensors and the encoders etc., and has algorithms stored in memory for executing the functions described in the present specification.

The operation for taking a container 2 into the stocker 3 is described first. The support platform 20 is placed in the standard attitude at the non-operator's transfer location Q and in the lifted position Up for transporting with no container 2 supported. With the support platform 20 in this state, the self-propelling vehicle 23 is caused to move to the end of the travel path L on the side of the operator's transfer location P (see FIG. 6 (*a*)). The support platform 20 is lowered to the lowered position Dw for transferring (see FIG. 6 (*b*)) where it waits until the container 2 is set on the article receiving platforms D by the operator. If the container 2 has already been in place when the self-propelling vehicle 23 is located in the end of the travel path L on the side of the non-operator's transfer location Q, the self-propelling vehicle 23 can simply be moved to the end of the travel path L on the side of the operator's transfer location P with the support platform 20 lowered to the lowered position Dw for transferring. In any event, when the container 2 is placed above the support platform 20 which has been lowered to the lowered position Dw for transferring (see FIG. 6 (*c*)), the support platform 20 is raised to the lifted position Up for transporting to scoop up (that is, to receive) the container 20. And after the self-propelling vehicle 23 is caused to have traveled to the end of the travel path L on the side of the non-operator's transfer location Q, the support platform 20 is lowered to the lowered position Dw for transferring after the support platform 20 is switched to the rotated attitude, after which, the container 2 is unloaded (that is, transferred) to a transfer position in the non-operator's transfer location Q. Thereafter, the in-storage transfer device 4 operates to store the container 2 to a target storage unit selected from empty storage units 16.

Operations for taking out a container 2 from the stocker 3 are described next. The in-storage transfer device 4 scoops up the container 2 to be taken out from the storage unit 16, and unloads the container 2 to the transfer position in the non-operator's transfer location Q. If the self-propelling vehicle 23 is located in the end of the travel path L on the side of the non-operator's transfer location Q at this time, the support platform 23 is lowered to the lowered position Dw for transferring with the support platform 23 in the rotated attitude. If the self-propelling vehicle 23 is not located in the end of the travel path L on the side of the non-operator's transfer location Q, the self-propelling vehicle 23 is caused to travel to the end of the travel path L on the side of the non-operator's transfer location Q after the container 2 is set at the transfer position in the non-operator's transfer location Q. In that case, the support platform 23 is lowered to the lowered position Dw for transferring in advance. And the support platform 23 is switched to the rotated attitude after stopping at the end on the side of the non-operator's transfer location Q. In any event, after the container 2 has been set above the support platform 20 which is lowered to the lowered position Dw for transferring in the rotated attitude at the non-operator's transfer location Q, the support platform 20 is raised to the lifted position Up for transporting to scoop up the container 20. And after the support platform 20 is switched to the standard attitude, the self-propelling vehicle 23 is caused to have traveled to the end of the travel path L on the side of the operator's transfer location P, and then the support platform 20 is lowered to the lowered position Dw for transferring to unload the container 2 to the transfer position in the operator's transfer location P. After that, the operator takes the container 2 out.

When carrying a container 2 into or out of the stocker 3 as described above, the operator may place her hand on the top plate 22 of the conveyor 1 near the operator's transfer location P. However, the end forming portion 22E of the slit 24—which forms the end on the side of the operator's transfer location P in the operator's transfer location P side portion of the top plate 22—includes a plate-shaped resilient member made of silicon rubber as a resilient cover 22S which can be elastically deformed; thus, when the operator carelessly places fingers on the top plate 22 near the operator's transfer location P, the fingers may be pressed against due to a movement of the support platform 20 as the self-propelling vehicle 23 moves or due to a vertical movement of the support platform 20. However, it is difficult for the fingers to be injured because the resilient cover 22S is elastically deformed.

Other Embodiments

Other embodiments are described in turn next.

(1) Although the resilient cover is described to be made of a plate-shaped resilient member as an example in the above-described embodiment, it is not limited to this and a tubular resilient member having a tubular cross section or a resilient member having comb-like teeth may be used instead.

(2) In the embodiment described above, the resilient cover and the inelastic cover portion connected at a boundary of a circular arc is described as an example. However, the connection does not need to be limited to this configuration. And the resilient cover and the inelastic cover portion may be connected at a bracket shaped, V-shaped, or U-shaped boundary.

(3) Although the connecting portion is described to consist of two members including the moving bracket 25a and the connecting member 29 in the embodiment described above. However, it does not need to be limited to this configuration. And the connecting portion may consist of three or more members or of a single member.

(4) Although the vertical movement means includes the vertical movement motor with a ball screw shaft and a moving bracket as an example in the embodiment described above. However, it does not need to be limited to this configuration. The specific configuration of the vertical movement means may be changed suitably: for example, it may include an electric motor equipped with an electric cylinder or a rack-and-pinion mechanism.

(5) In the embodiment described above, the top plate is made of aluminum, as an example. However, the top plate may be made of, for example, other metal such as stainless steel or hard resin such as plastic.

(6) In the embodiment described above, a travel actuating means is provided in the movable body main body (reciprocating movable body). However, the movable body does not need to be limited to this configuration. The reciprocating movable body does not have to have a travel actuating means in the movable body main body. Instead, a travel actuating means may be fixed and a chain or a belt may be connected to the movable body main body. And the chain or the belt may be wound or fed out and taken in to cause the reciprocating movable body to travel.

(7) In the embodiment described above, the support member consists of support platforms 20 which can be rotated and moved vertically, as an example. However, the support platform does not have to be capable of being rotated or moved vertically. In addition, the support member does not have to be a support platform, and may be a frame member with frame structure.

(8) In the embodiment described above, unbent plate-shaped members 48 are screwed to, and thus, attached to the side faces 20s of the support platform 20 as an example. In place of this, plate-shaped members 48, each of which is formed to have an L-shape to have a flange portion, may be used. And to attach, the flange portion may be welded to or screwed to the bottom of the support platform.

(9) In the embodiment described above, the end forming portion of the cover body consists of a resilient cover and an inelastic cover portion, as an example. However, the entire end forming portion of the cover body may consist of a resilient cover.

INDUSTRIAL APPLICABILITY

The invention may be used in a rack for storing articles.

DESCRIPTION OF THE REFERENCE NUMERALS AND SYMBOLS

P Operator's transfer location
Q Non-operator's transfer location
L Travel path
D Article receiving platform
2 Article
3 Article storage
20 Support platform (Article support)
22 Cover body
22E End forming portion
22H Inelastic cover portion
22S Resilient cover (Plate-shaped resilient member)
23 Reciprocating movable body
24 Slit
25 Vertical movement means
25a, 29 Connecting portion
41 Load bearing portion
41s Support surface
48 Plate-shaped member

The invention claimed is:

1. An article transporting device comprising:
a reciprocating movable body configured to move in forward and backward directions along a travel path having two ends and extending between a non-operator's transfer location and an operator's transfer location to and from which an article is transferred by an operator;
a cover body which partially covers an area above the reciprocating movable body which travels over an entire length of the travel path, the cover body having a slit formed therein; and
an article support for supporting an article and connected to the reciprocating movable body by a connecting portion which extends upwardly from the reciprocating movable body and vertically through the slit, the article support being configured to move above the cover body along a direction of the travel path as the reciprocating movable body moves in the forward and backward directions along the travel path,
wherein the slit is formed such that the connecting portion remains out of contact with the cover body when the reciprocating movable body moves along the travel path, and
wherein a flexible and resilient cover which can be elastically deformed is provided in an end forming portion of the cover body which forms an end of the slit on a side of the operator's transfer location,
the resilient cover being provided partially along the travel path.

2. The article transporting device as defined in claim 1, wherein a portion of the end forming portion consists of the resilient cover, and the resilient cover consists of a plate-shaped resilient member in which a cut-out portion defining the end of the slit on the side of the operator's transfer location is formed, and wherein a portion of the end forming portion other than the resilient cover includes an inelastic cover portion located in a periphery of the resilient cover, and the resilient cover and the inelastic cover portion are connected at a circular-arc-shaped boundary.

3. The article transporting device as defined in claim 1, wherein the article support is configured to be raised to a raised position and lowered to a lowered position by vertical movement member provided to the reciprocating movable body, and includes a plate-shaped support platform whose dimension in a lateral direction with respect to the travel path is less than a lateral dimension of an article to be transported and wherein article receiving platforms for receiving and supporting the article to be transported are provided at the operator's transfer location, wherein the article receiving platforms include a pair of load bearing portions having support surfaces which are located higher than an upper surface of the support platform in the lowered position and which are located lower than an undersurface of the support platform in the raised position with the load bearing portions extending inwardly toward a pair of side faces located on either side, in the travel path lateral direction, of the support platform located in the operator's transfer location, and wherein a pair of plate-shaped members is provided to the support platform for blocking gaps formed between the undersurface of the support platform and the support surfaces of the pair of load bearing portions when the support platform is in the raised position.

4. The article transporting device as defined in claim 1, wherein the operator's transfer location is located outside an article storage for storing a plurality of articles, and the non-operator's transfer location is located inside the article storage.

5. The article transporting device as defined in claim 2, wherein the inelastic cover portion includes an upwardly facing face which contacts a part of a bottom face of the resilient cover, and a vertically extending face which contacts at least a part of a side face of the resilient cover that extends vertically.

6. The article transporting device as defined in claim 3, wherein each of the plate-shaped members is configured to extend downwardly beyond a corresponding one of the support surfaces of the load bearing portions when the support platform is in the raised position.

* * * * *

UNITED STATES PATENT AND TRADEMARK OFFICE
CERTIFICATE OF CORRECTION

PATENT NO.       : 8,708,137 B2
APPLICATION NO.  : 13/130175
DATED            : April 29, 2014
INVENTOR(S)      : Yoshioka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 267 days.

Signed and Sealed this
Twenty-ninth Day of September, 2015

Michelle K. Lee
*Director of the United States Patent and Trademark Office*